United States Patent Office 2,967,602
Patented Jan. 10, 1961

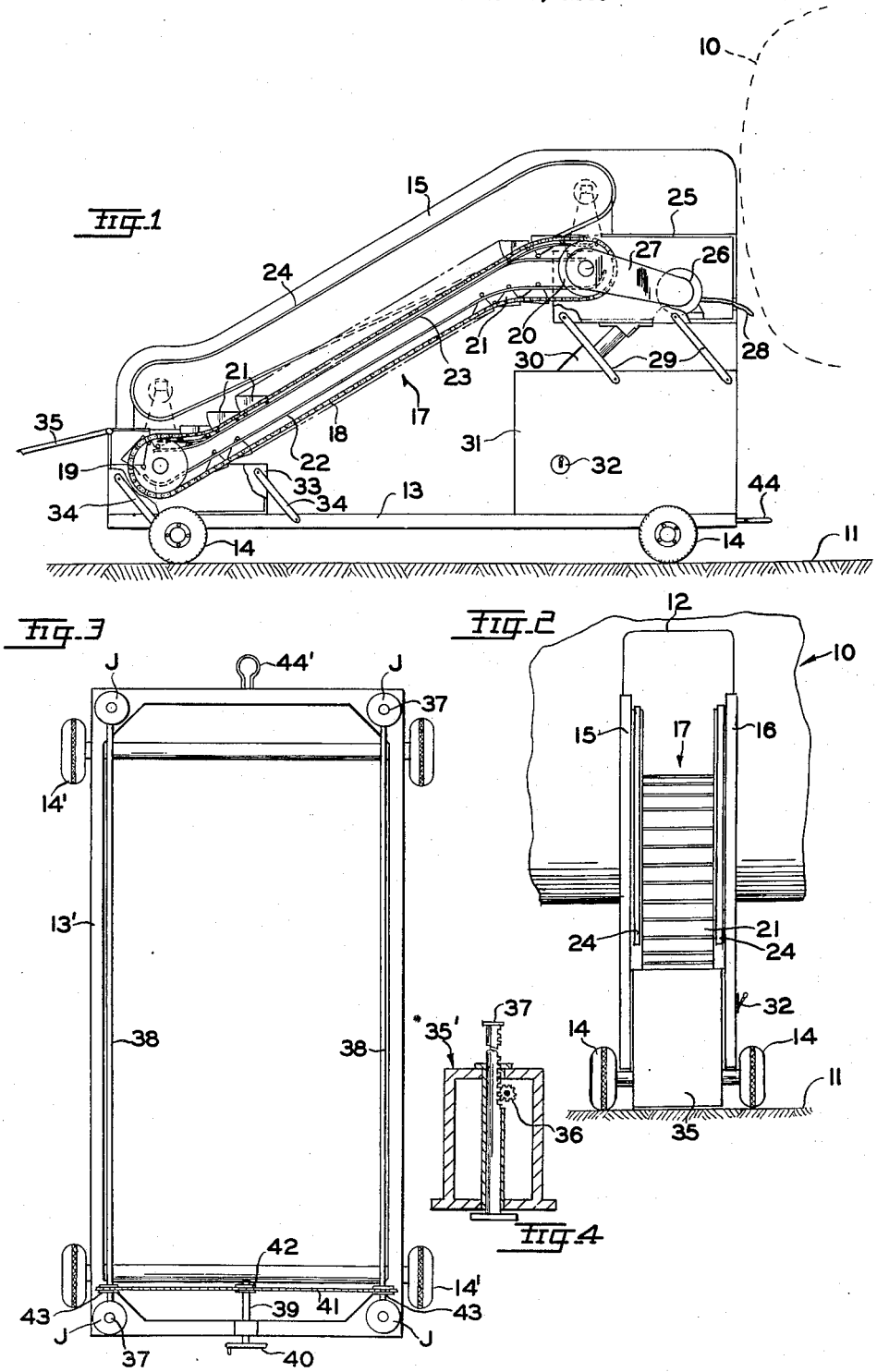

2,967,602

BOARDING APPARATUS FOR AIRCRAFT AND THE LIKE

Russell B. Mosier, deceased, late of Meadville, Pa., by Ethel J. Mosier, administratrix, 376 Ben Avon St., Meadville, Pa.

Filed June 26, 1959, Ser. No. 823,151

8 Claims. (Cl. 198—16)

This invention relates to an improved form of stairway for use by passengers in boarding and leaving aircraft and other conveyances, for example, ships, having passenger doors and entryways which are normally at a considerable distance above the ground level when in position to receive and discharge the passengers.

The invention was conceived primarily for use as an improved airport facility, air travel of course constituting the largest, continuing activity in which such loading conditions necessarily obtain, and the new apparatus will accordingly be described with particular reference to such an application thereof. Present day aircraft boarding devices, while varying somewhat in minor structural details, are all basically nothing more than rigid stairways mounted on wheeled frames to provide the portability which is an obvious essential requirement for such a device. Where such a stairway may be required to serve several types of airplanes the doors of which will not be uniformly spaced above the ground, a short upper section may be capable of being extended and retracted to accommodate such variation in the desired elevation. The bodies or cabins of all commercial passenger aircraft are, however, supported a substantial distance above the ground surface, so that the stairway is invariably quite steep.

The climbing of such a stairway is thus a fairly strenuous effort, which would perhaps be regarded by most passengers as a tolerable inconvenience. For others, however, the chore could be considerable and possibly even damaging; for example, there are a great many people who because of their age or state of health must seriously curtail or even avoid completely physical exertion of the order involved in ascending a stairway. This seemingly easy task obviously could also be extremely burdensome for persons who are temporarily or permanently crippled, and the result is that air travel is not conveniently available, as a practical matter, to a sizable portion of the public. In most, if not all, of such cases, the flight itself is safe and comfortable, so that the manner of boarding and leaving the airplane is the real limitation, which now can be avoided only by such cumbersome and unwelcome expedients as having attendants carry the passenger to and from the airplane.

It is a primary object of the invention to provide a moving stairway of such construction and arrangement as to be usable for passanger boarding of aircraft and the like, thereby not only to make such operation more convenient but to remove completely the noted problems and limitations presented by and inherent in the aforesaid conventional devices of this nature.

Another object is to provide a moving stairway, including drive means therefor, as unitary apparatus capable of being readily propelled over the ground.

It is an additional object of the invention to provide such a portable moving stairway which is adjustable vertically without changing the inclination thereof, whereby the treads in the lift portion are maintained in their proper horizontal planes in all such positions of adjustment.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation of boarding apparatus constructed in accordance with the present invention, with the near wall thereof removed to show the operating mechanism;

Fig. 2 is a front elevation of such apparatus;

Fig. 3 is a plan view of a modified form of base or carriage for the apparatus; and Fig. 4 is a sectional view of a jack employed with the carriage shown in Fig. 3.

Referring now to the drawings in detail, the fragmented structure designated by reference numeral 10 is intended to represent a section of an airplane body supported by its undercarriage above a ground surface 11, with a door 12 in this wall section constituting the normal opening through which passengers enter and leave the airplane.

The boarding apparatus of the invention is shown in its operative condition of use for serving such airplane and, in the embodiment shown in Figs. 1 and 2, comprises a carriage 13 supported by ground-engaging wheels 14, such carriage being rectangular with the wheels mounted on transverse shafts adjacent the respective ends of the same. Panels 15 and 16 are secured to and extend upwardly from the longitudinal sides of the carriage and a moving stairway, designated generally by reference numeral 17, is disposed between such sides. This stairway is of conventional construction, comprising an endless chain 18 engaged with a sprocket 19 at its lower end and with a drive sprocket 20 at the upper end thereof. A series of stair members 21 are connected to the chain in the usual manner and move along inner track sections 22 and 23 arranged to support the members as they move along the path of the chain. The track 23 is of course operative to so position the members 21 in the lifting flight of the stairway that their upper surfaces or treads are horizontal.

An endless hand rail 24 is provided at each side of the moving stairs, driven conventionally by further endless chains, not shown, interconnected with the main drive for the stairway. Drive sprocket 20 of the latter is mounted within an upper box-like housing 25 which also contains an electric drive motor 26 having an enclosed drive connection 27 to the shaft of the sprocket 20. Such motor is adapted to be connected to an appropriate source of electric energy by means of a cable extending from the unit and shown partially at 28. The top wall of the housing 25 will be seen to constitute a horizontal continuation of the stairway or a bridge between the upper end of the moving stair members and the door of the airplane. To accommodate variation in the height of the door above the ground, the housing 25 is supported for vertical adjustment between the side walls or panels 15 and 16 by parallel links 29 and an inclined piston-cylinder assembly 30. Two such links are provided at each side of the housing, pivoted thereto at their upper ends and pivotally connected at their lower ends to a further stationary housing 31 supported on the carriage of the apparatus. The piston-cylinder assembly extends between the two such housings and is operated in conventional manner by hydraulic fluid under control of an external hand wheel 32 to raise and lower the upper housing and hence the upper end of the stairway.

The design of the moving stairs is itself rigid, with the sprockets, track sections and individual stair members so related that these members will be moved to and maintained in positions in which their upper surfaces or treads are horizontal during their travel along the lifting flight, and it will thus be seen that a change in the inclination of the assembly would cause the treads to be angularly displaced from the horizontal. To avoid this objectionable result, the lower end of the moving stairway is also mounted for vertical adjustment correspondingly as the upper end. Thus, the bottom sprocket 19 is mounted in a lower front housing 33 movable between the side panels and secured to the carriage 13 by means of pivoted links 34 which are parallel to the links 29 connecting the upper housing 25.

By such support, the entire moving stairway is shifted by the hydraulic piston-cylinder assembly to adjust the same vertically while maintaining the original design inclination thereof. To facilitate boarding the stairway, a plate 35 is hinged to the upper outboard end of the lower housing 33 and rests at its outer end on the ground. When not in use, this ramp may be swung upwardly out of the way and, when lowered, it will of course provide an easily traversed ramp from the ground to the bottom of the moving stairway in all positions of adjustment of the latter.

In Fig. 3, there is shown a slightly different construction for providing the desired vertical adjustment. This construction utilizes four jacks J respectively mounted at the corners of the wheeled carriage 13' and adapted, by engagement with the ground, adjustably to support the complete unit. Such jacks should preferably be actuated simultaneously and, to such end, drive pinions 36 for the two jack columns 37 at each side are mounted on a common shaft 38, and the two such shafts are actuated by a single drive shaft 39 operated by a hand wheel 40 and an endless chain 41 trained about a sprocket 42 on the drive shaft and about sprockets 43 on the pinion shafts. In this modification, the complete apparatus including the carriage is adjustable to different elevations above the ground, whereas in the Fig. 1 construction the moving stairway assembly is shifted relative to the carriage.

A drag eye 44 is shown at the front end of the carriage to facilitate moving the apparatus into operative position, preferably by means of a small truck pulling the same. It is also contemplated that the electric motor could be energized from a generator truck of the type commonly used at airports to provide electric power for idle aircraft, this being a convenient and available source of power. The motor could also be driven by batteries contained in the unit itself, and the apparatus could easily be made fully self-operative by mounting an engine and wheel driving mechanism thereon for propelling the carriage.

Other modes of applying the principle of the invention may be employed, change being made as regards the details described, provided the features stated in any of the following claims or the equivalent of such be employed.

What is, therefore, particularly pointed out and distinctly claimed as the invention is:

1. Boarding apparatus for aircraft and the like comprising a moving stairway mounted on a mobile frame, means interconnecting said frame and said stairway for vertical uniform movement for the top and bottom thereof as a unit, and power means on said frame thus to raise and lower said stairway thereby to maintain the treads of said stairway substantially horizontal.

2. The boarding apparatus as set forth in claim 1 wherein said power means comprises a piston and cylinder and said stairway is mounted on said frame by pivotal links.

3. The boarding apparatus of claim 2 including a self-adjusting ramp connected to the front of said stairway.

4. The boarding apapratus of claim 3 wherein said moving stairway is power driven and includes moving endless handrails on each side thereof.

5. Boarding apparatus for aircraft and the like comprising a power driven conveyor, parallel link means pivotally mounting said conveyor on a mobile frame for unitary vertical movement, piston and cylinder means disposed between said mobile frame and said conveyor, and self-adjusting ramp means connected to the lower end of said conveyor.

6. Boarding apparatus for aircraft and the like comprising a rectangular carriage supported by ground engaging wheels mounted on transverse shafts adjacent the respective ends thereof, a moving stairway mounted on said carriage comprising an endless chain having a series of stair tread members connected thereto, track sections arranged to support said stair tread members as they move along the path of the chain operative to position said members in the lifting flight of the stairway so that the upper surfaces are horizontal, an endless handrail at each side of said moving stairs and means to drive said handrail and stairs for movement, said drive means being mounted within a housing at one end of said moving stairs with the top wall of said housing constituting a horizontal continuation of the upper end of the stairway to provide a bridge between said upper end and the door of an aircraft against which said boarding apparatus is adapted to be placed, and height adjusting means interconnecting the bottom and top respectively of said moving stairway with said carriage operative uniformly vertically to move the bottom and top of said stairway thereby vertically to move said stairway bodily as a unit to accommodate variation in the height of said door above the ground while maintaining said stair tread members susbtantially horizontal when in the lifting flight of said stairway.

7. A boarding apparatus as set forth in claim 6 wherein said height-adjusting means comprises an inclined piston-cylinder assembly the rod of which is attached to said housing, and link means provided at each side of said housing pivoted thereto at their upper ends and pivotally connected at their lower ends to a portion of said carriage, and further link means parallel to said first-mentioned link means, the upper ends of which are pivotally connected to the lower front portion of said movable stairway and connected at their lower ends to said carriage, whereby actuation of said piston-cylinder assembly will vertically adjust the height of said moving stairway to accommodate variation in the height of such door above the ground while maintaining said tread members in the lifting flight of said stairway horizontal.

8. Boarding apparatus for aircraft and the like comprising mobile frame means, a moving stairway mounted on said mobile frame means, drive means for said moving stairway, means mounting the top and bottom of said stairway on said mobile frame means limiting all parts of said stairway to uniform vertical movement, and means interconnecting said stairway and frame to raise and lower said stairway with respect to said frame, whereby to maintain the treads of said stairway substantially horizontal at all elevations thereof.

References Cited in the file of this patent
UNITED STATES PATENTS 2,512,150    Geren _____ June 20, 1950

FOREIGN PATENTS 122,605    Australia _____ Oct. 24, 1946
772,722    Great Britain _____ Apr. 17, 1957